United States Patent
Carli et al.

[11] Patent Number: 6,115,647
[45] Date of Patent: Sep. 5, 2000

[54] SYSTEM AND METHOD FOR THE WIRELESS SIGNAL TRANSMISSION FOR CHECKING PROBES

[75] Inventors: Carlo Carli; Andrea Ferrari, both of Ferrara, Italy

[73] Assignee: Marposs Societa'per Azioni, Bentivoglio, Italy

[21] Appl. No.: 08/952,002

[22] PCT Filed: May 6, 1996

[86] PCT No.: PCT/EP96/01874

§ 371 Date: Nov. 7, 1997

§ 102(e) Date: Nov. 7, 1997

[87] PCT Pub. No.: WO96/36028

PCT Pub. Date: Nov. 14, 1996

[30] Foreign Application Priority Data

May 12, 1995 [IT] Italy ................................ BO95A0228

[51] Int. Cl.[7] ................................................. G10B 11/00
[52] U.S. Cl. ........................................... 700/194; 700/95
[58] Field of Search ................................. 340/636, 680, 340/825.54, 825.69; 700/192, 195, 3, 6, 94, 174, 95

[56] References Cited

U.S. PATENT DOCUMENTS

| | | | |
|---|---|---|---|
| 4,661,912 | 4/1987 | Imanishi | 700/169 |
| 4,693,110 | 9/1987 | Juengel | 700/195 |
| 5,034,997 | 7/1991 | Iwasaki | 340/825.69 |
| 5,602,524 | 2/1997 | Mock et al. | 340/447 |
| 5,739,433 | 4/1998 | Beck | 340/680 |
| 5,748,465 | 5/1998 | Kaneko | 700/3 |
| 5,905,438 | 5/1999 | Weiss et al. | 340/636 |
| 5,907,813 | 5/1999 | Johnson, Jr. et al. | 455/502 |

FOREIGN PATENT DOCUMENTS 0 428 322 A1  11/1990  European Pat. Off. .
0 467 036 A2  5/1991  European Pat. Off. .

*Primary Examiner*—William Grant
*Assistant Examiner*—Kidest Bahta
*Attorney, Agent, or Firm*—Dickstein Shapiro Morin & Oshinsky, LLP

[57] ABSTRACT

A system for numerical control machine tools comprises contact detecting probes, powered by a battery, that transmit radio-frequency signals to associated interfaces. When the probes are not being utilized for checking cycles, they are in a low-energy consumption state, in other words the circuits of the probes are only partially powered. When the need arises, the circuits of a probe are fully powered by the battery, by a radio-frequency activation signal. The procedure for activating a selected probe includes the sending of a generic activation signal from the associated interface, the transmitting of an identification signal from all the probes that have been activated by the generic signal and the sending of a generic confirmation signal from the interface in reply to the identification signal of the selected probe.

15 Claims, 5 Drawing Sheets

SYSTEM AND METHOD FOR THE WIRELESS SIGNAL TRANSMISSION FOR CHECKING PROBES

The application claims the benefit of PCT Application Ser. No. PCT/EP96/01874, filed May 6, 1996.

TECHNICAL FIELD

The invention relates to a system comprising a plurality of assemblies with detecting devices, transmitting devices for the wireless transmission of signals, including means for generating and sending identification signals, receiving devices for the wireless reception of an activation signal for activating the assemblies, power supply means, and switching means adapted for providing connection between the power supply means and the transmitting devices, and at least a control unit, physically remote from the assemblies, with means for generating and transmitting the activation signal, means for receiving the identification signal, and means for generating and transmitting to the assemblies a confirmation signal, the receiving device being apt for receiving said confirmation signal. The invention also relates to a method for controlling the activation of a remote assembly by a control unit in a system with at least one control unit and a plurality of assemblies, physically remote from the control unit and comprising power supply means, detecting devices, receiving devices and transmitting devices for receiving and transmitting wireless signals, the method comprising the following steps: generating and sending an activation signal by the control unit, receiving said activation signal by the receiving devices of at least a part of said plurality of assemblies, temporary energizing the assemblies of said part further to said reception, sending, by the transmitting devices of the assemblies belonging to said part, associated identification signals at instants subsequent to said temporary energizing, receiving the identification signals by the control unit, sending, by the control unit, a confirmation signal upon reception of one of the identification signals, and interrupting the temporary energizing of each assembly that does not receive the confirmation signal subsequently to the sending of the associated identification signal.

BACKGROUND ART

There are known measuring systems as, for example, systems in numerical control machine tools for detecting the position and/or the dimensions of workpieces, by checking heads, or contact detecting probes mounted in the machine, that in the course of the checking cycles displace with respect to the workpiece, touch the surface to be checked and, after contact has occurred, cause the wireless transmission of signals to receiving units.

Each receiving unit is in turn connected, by means of an interface unit, to a relevant numerical control unit that, by processing other signals indicative of the position of the probe, receives information about the position of the workpiece surfaces.

The probes can include electric batteries for the power supply of the circuits detecting contact and the transmission devices. The wireless transmission can occur, for example, by emitting electromagnetic signals of optical or radio-frequency type.

Since a probe is utilized just for short time intervals during the machining cycle of its machine tool, it is normally kept in a "stand-by" condition of low power consumption and it is powered up only when there is the need to perform a checking cycle.

The switching from the "stand-by" condition to the "powered-up" state can be carried out by controlling suitable switching devices on the probe by means of wireless activation signals sent by the receiving unit.

A system of this type is illustrated and described in U.S. Pat. No. 4,693,110.

In a working environment, for example in a workshop, there can be multiple checking probes, installed in various machine tools: each machine tool can comprise, in general, one or more probes for performing checking cycles and sending associated signals to the receiving unit of that machine. Generally, for each machine tool just a probe at a time is selected to perform a checking cycle, even though there are cases in which, in specific machines, two (or, in theory, more) probes perform checkings in partially coincident moments.

When an activation signal is sent by the interface of a machine for energizing a specific probe in the machine that has to perform a checking cycle, it is advisable to avoid that other probes in that machine or in adjacent machines be concurrently activated.

The need to activate an individual probe and not others operating in the same environment is particularly evident when transmission between the probe and the receiving unit occurs (in both ways) by means of radio-frequency modulated signals, as in this case, unlike to what occurs, for example, in optical-type transmissions, it is practically impossible to assign a precise direction to the emitted radiation, and a single activation signal "awakes" all the probes in a specific working area.

A radio telemetry system in which a master station activates a plurality of transponders is disclosed by EP-A-0428322. In the system therein described, the transponders are meters and the master station, that is movable, has to collect the data reported from all of them, one by one, and does so, awaking them from a stand-by state, in a substantially random order. In fact, the order depends on different circumstances occurring at the moment the awaking action starts (e.g.: which of a number of radio channels is the quietest; which of the meters is listening on that channel; which of the awoke meters is the nearest to the movable station; . . . ).

As a consequence, the system shown in EP-A-0428322 cannot be used in a measuring system in which a selected, specific probe has to be activated.

DISCLOSURE OF THE INVENTION

Object of the present invention is to provide a system and a method for the wireless transmission of electromagnetic signals between checking probes and remote receiving units, that enables to activate, in a simple and inexpensive way, an individual probe among a plurality of probes operating in a specific environment.

This object is achieved by a system and an associated method, according to claims 1 and 7.

An advantage that a system and a method according to the invention provide consists in the possibility of utilizing, on the probe, a very simple and low-consumption receiver; this advantage becomes of considerable importance in the case of radio-frequency signal transmission.

BRIEF DESCRIPTION OF THE DRAWINGS

An embodiment of the invention is hereinafter described in more detail with reference to the enclosed sheets of drawings, given by way of non limiting example only, wherein.

BEST MODE FOR CARRYING OUT THE INVENTION

Figure 1:
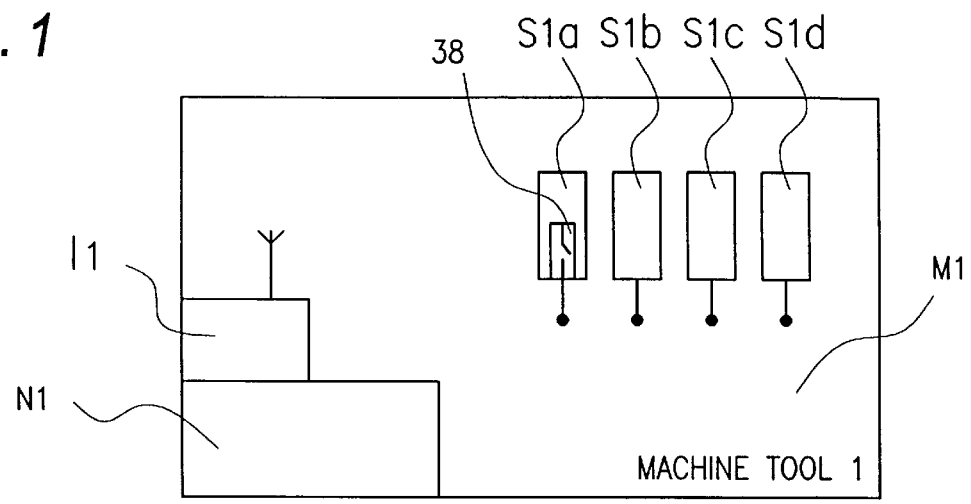
FIG. 1 shows, in simplified form, the probes and the interface devices of a plurality of machine tools installed in a specific working environment.
Figure 1:
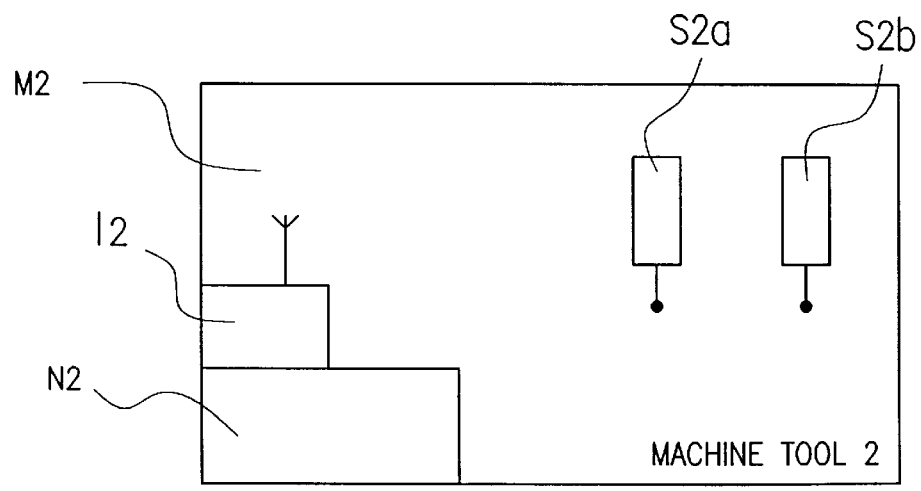
Figure 1:
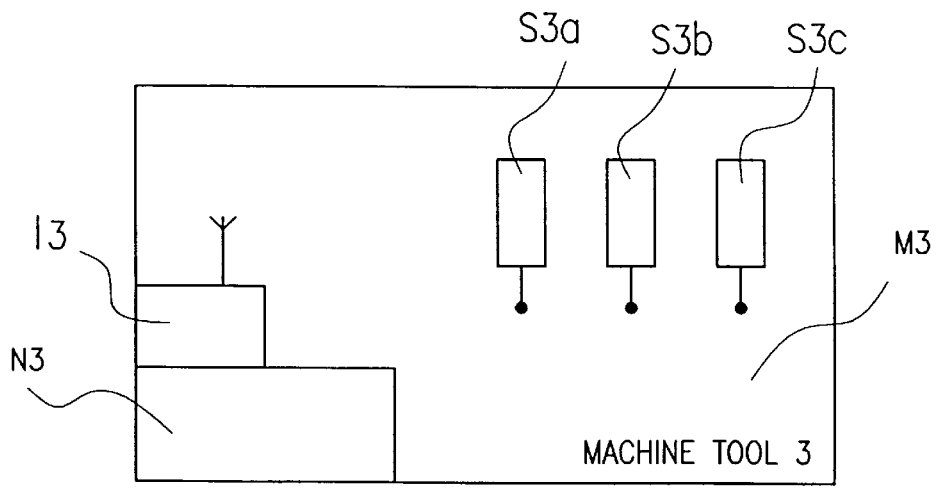

FIG. 1 illustrates, in simplified form, three machine tools (for example, lathes and/or machining centers) M1, M2 and M3, located in a same working area, with associated numerical controls N1, N2, N3, and interface devices I1, I2 and I3.

Some checking probes, more specifically contact detecting probes, are installed on M1 (S1$a$, S1$b$, S1$c$ and S1$d$), M2 (S2$a$ and S2$b$) and M3 (S3$a$, S3$b$ and S3$c$), physically remote from the relevant interface devices I1, I2 and I3.

Each probe comprises known detecting devices, in particular switching devices. With reference to FIG. 1, these devices have been schematically shown and identified, for the sake of simplicity, with reference number 38 specifically just for probe S1$a$. The interface devices and the probes comprise radio-frequency receiving and transmitting devices, shown in FIGS. 2 and 3, for receiving and transmitting wireless signals.

Figure 2:
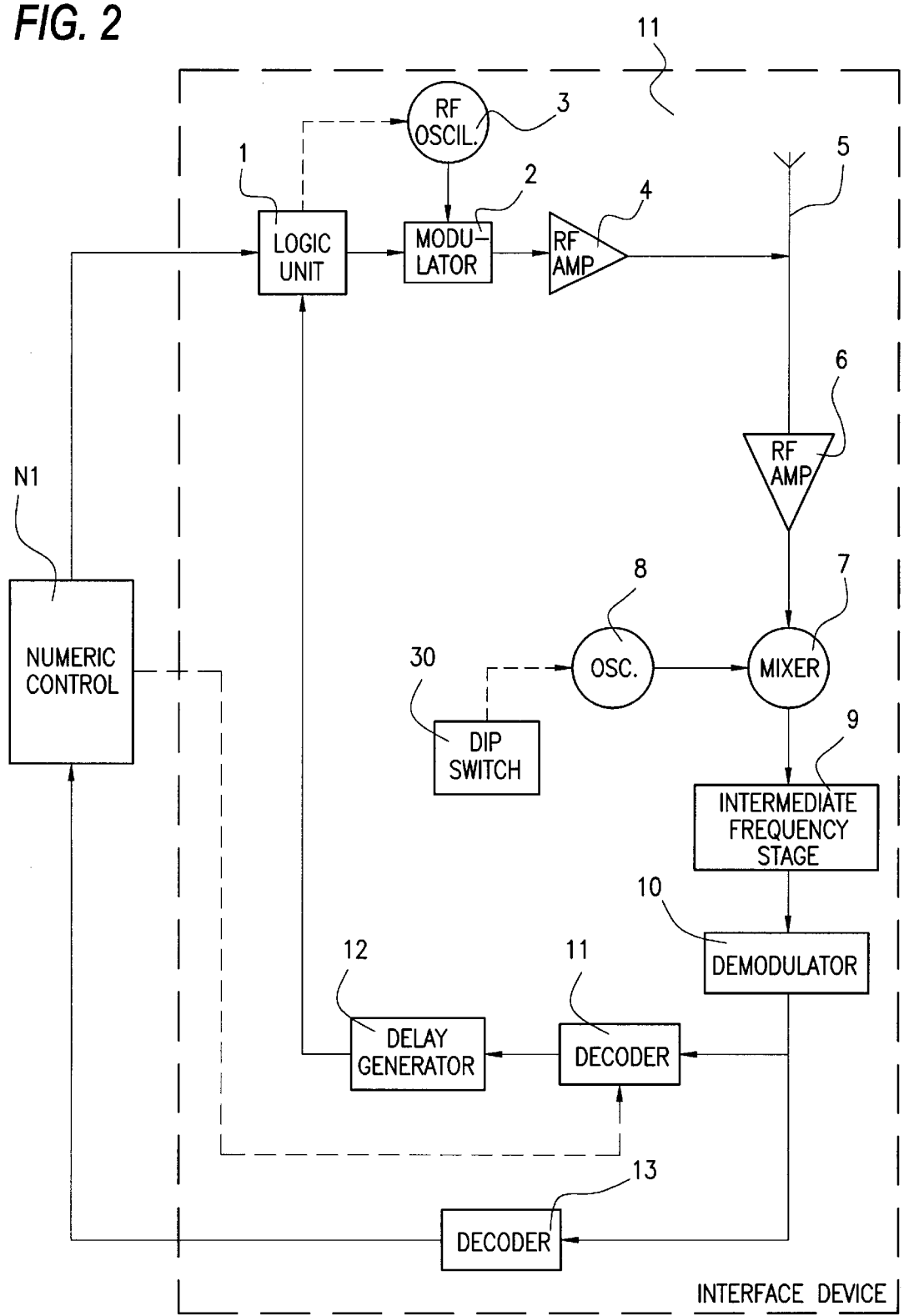
FIG. 2 is a block diagram of a transceiver section an interface device.

In particular, a control unit of the interface device shown in FIG. 2, for example, I1, comprises a logic unit 1, for generating activation and enable signals, coupled to numerical control N1 of machine M1, a radio-frequency oscillator 3 and a modulator 2, connected to each other and to unit 1, a radio-frequency amplifier 4 and an aerial 5 for amplifying and transmitting signals provided by modulator 2. A receiving section of the interface device (I1) comprises, apart from aerial 5, a superheterodyne receiver connected to the aerial, with a radio-frequency amplifier 6, a mixer 7, an intermediate frequency stage 9 and a demodulator 10. A local oscillator 8 is connected to mixer 7 and has an input connected to a programming device, in particular a dip-switch 30 that is typically programmed at the time of installation in the machine. A decoder 11 is connected between the superheterodyne receiver and, by means of a constant delay generator 12, to the logic unit 1 and has an input connected to the numerical control N1. A second decoder 13 is connected to the demodulator 10 and the numerical control N1.

Figure 3:
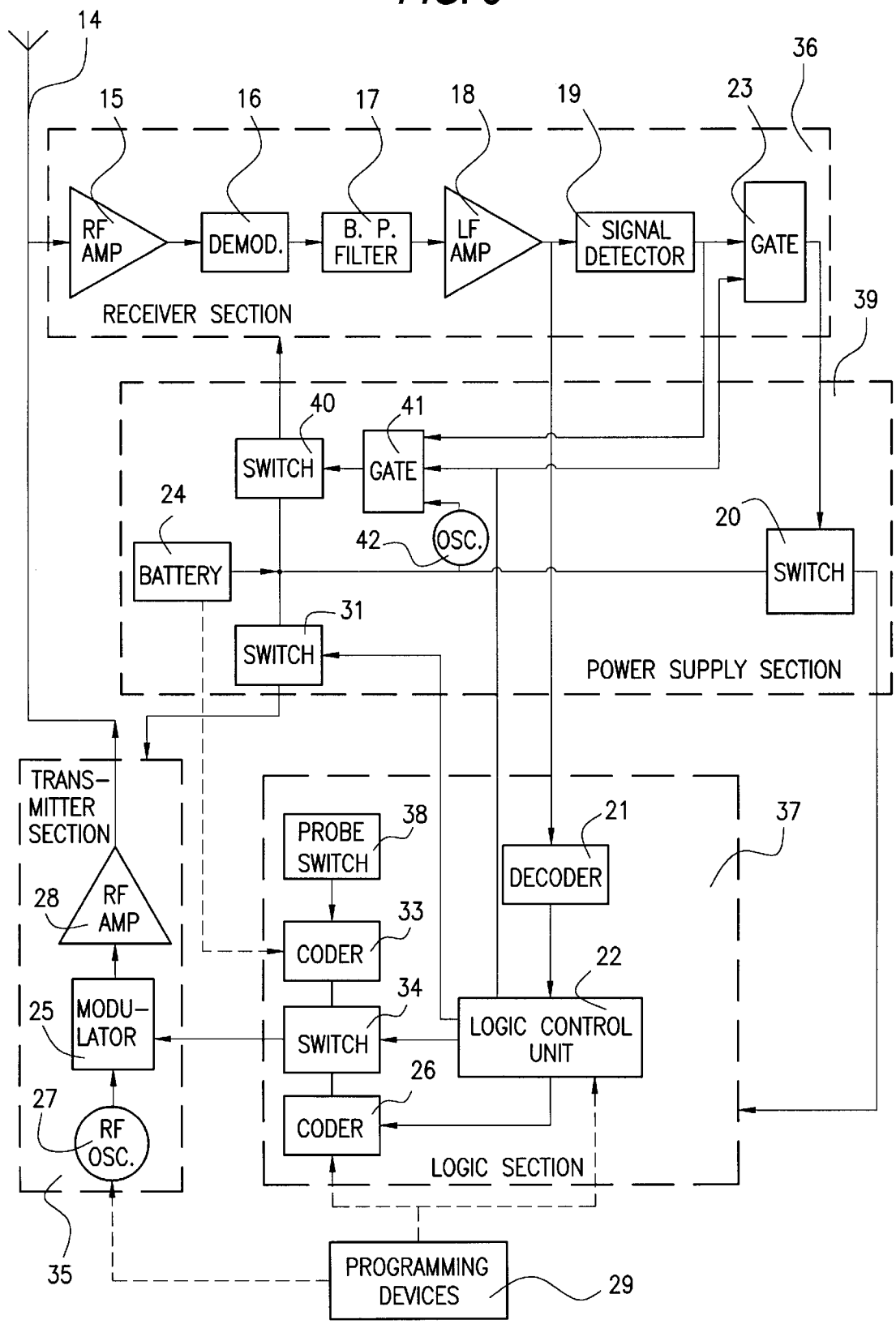
FIG. 3 is a block diagram of a transceiver section a probe.

Electric circuits, located in each probe, are schematically shown in FIG. 3 where they have been divided in four sections: a transmitter section 35, a receiver section 36, a logic section 37 and a power supply section 39.

The transmitter section 35 comprises a modulator 25, connected to a radio-frequency oscillator 27, the oscillation frequency of which is determined by signals arriving from programming devices, in particular a dip-switch, 29, that are typically programmed at the time of installation of the probe in the machine.

In the illustrated example, an identical frequency is assigned to all the probes on the same machine, while different frequencies are assigned to the probes on other machines (M1, M2, M3). In the same manner the devices 30 of the interface devices (I1, I2, I3) on each of the various machines are programmed.

A radio-frequency amplifier 28 is connected to modulator 25 and pilots an aerial 14.

The receiver section 36, connected to aerial 14, comprises, in sequence, a radio-frequency amplifier 15 with selective characteristics, a demodulator 16, a band-pass filter 17 tuned at the modulation frequency of the activation and enable signals, a low frequency amplifier 18, a signal detector 19, and a gate 23.

The logic section 37 comprises a decoder 21, for decoding the activation and enable signals, connected to the output of the low frequency amplifier 18, and a logic control unit 22, connected to decoder 21 and the programming devices 29, from which it receives the probe selection signals that are typically programmed at the time of installation in the machine.

A coder 26 for the identification signals is connected to the logic unit 22 and the devices 29, from which it receives the signals for the selection of the probe. Probe switch means 38 are connected to a coder 33 for determining the condition of the probe and that of a battery 24 (coder 33 also receives information from battery 24, referred to hereinafter).

A switch 34, controlled by logic unit 22, alternatively connects the coders 26 and 33 to modulator 25 in the transmitter section 35.

The power supply section 39 comprises power supply means with battery 24, switching means, with a switch 40 that connects battery 24 to receiver section 36, an oscillator circuit 42 (connected to the battery) and a gate 41. Gate 41 is connected to switch 40 for controlling the power supply of the receiver section 36 on the basis of the signals received from oscillator 42, signal detector 19 and logic unit 22. Furthermore, the power supply section 39 comprises second switching means, with a second switch 20 for connecting battery 24 to logic section 37. Gate 23 is connected to switch 20 for controlling the power supply of the logic section 37 on the basis of the signals received from signal detector 19 or from logic unit 22. Further switching means, including a third switch 31 connected to logic unit 22, that controls its state, control the power supply of the transmitter section 35.

Figure 4:
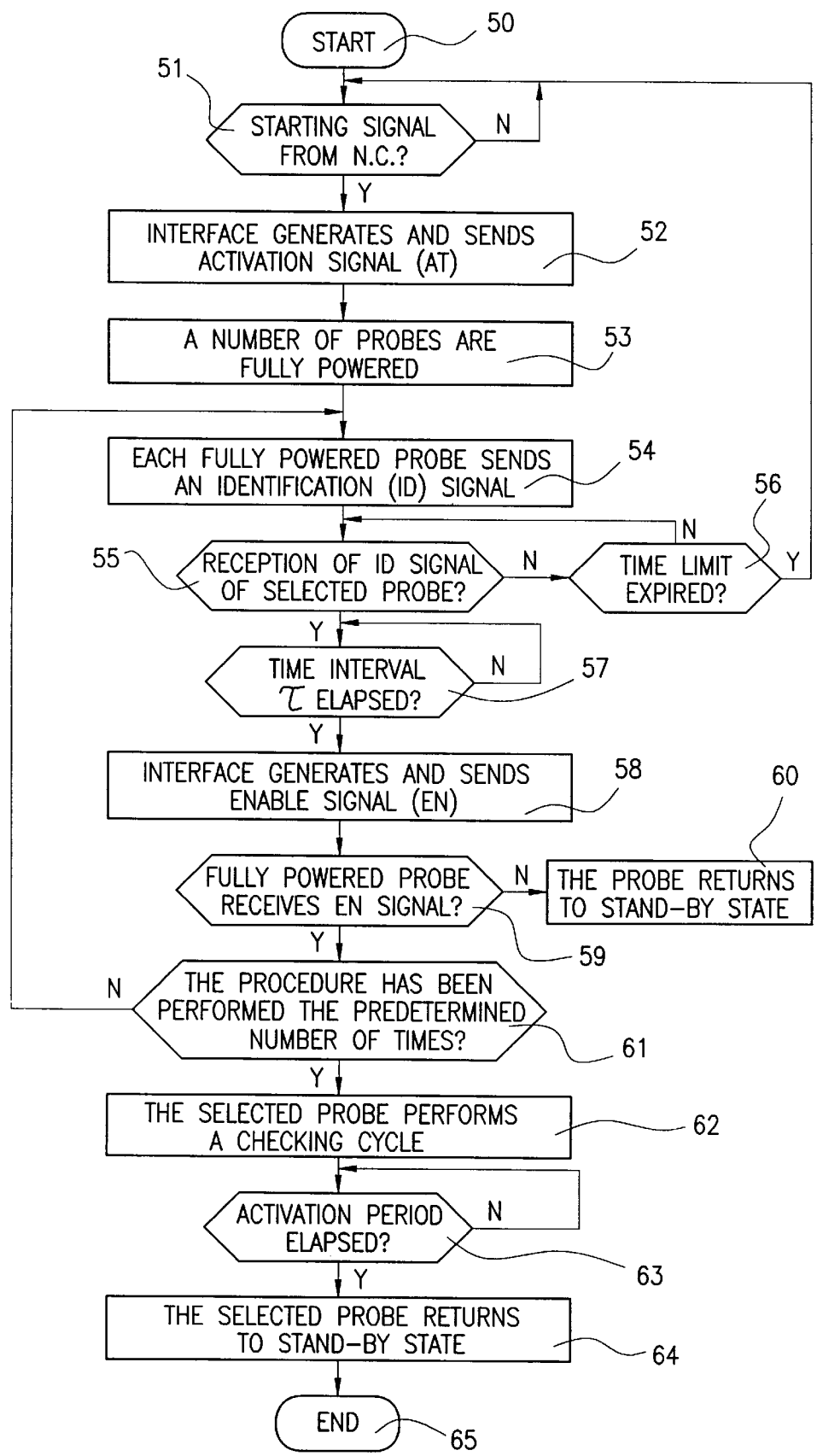
FIG. 4 is a block diagram indicating the functions according to a method of the invention.

In the diagram shown in FIG. 4, the logic blocks identify the following functions:

block 50—starting of the procedure for the activating of a probe (for example, S1$a$) on a specific machine (for example, M1);

block 51—test relating to the sending, or non sending, of a signal for the starting of the procedure from the machine numerical control (N1) to the inherent interface device (I1);

block 52—generating and sending, by the interface device (I1), of a generic activation signal AT;

block 53—activating, subsequently to receiving the signal AT, of a specific number of probes, in particular the probes that are within the operating range of aerial 5;

block 54—sending of an identification signal ID, at a random instant within a determined time interval, by each of the activated probes;

block 55—test relating to the identification signals ID received by the interface device I1;

block 56—test relating to the time elapsed after the sending of the activation signal AT;

block 57—test relating to the time ($\tau$) that has elapsed after the interface device I1 has received the identification signal ID sent by the probe S1$a$ selected for activation;

block 58—generating and sending, by the interface device I1, of a generic confirmation, or enable signal, EN;

block 59—test relating to the reception of EN by the activated probes;

block 60—change in the power supply state of some probes;

block 61—test relating to the number of inspections performed;

block 62—performing of the control cycle by the selected probe S1a, on the basis of the instructions provided by the associated numeric control N1;

block 63—test relating to the activating time of the selected probe S1a;

block 64—change in the power supply state of the selected probe S1a;

block 65—ending of the procedure.

Figure 5:
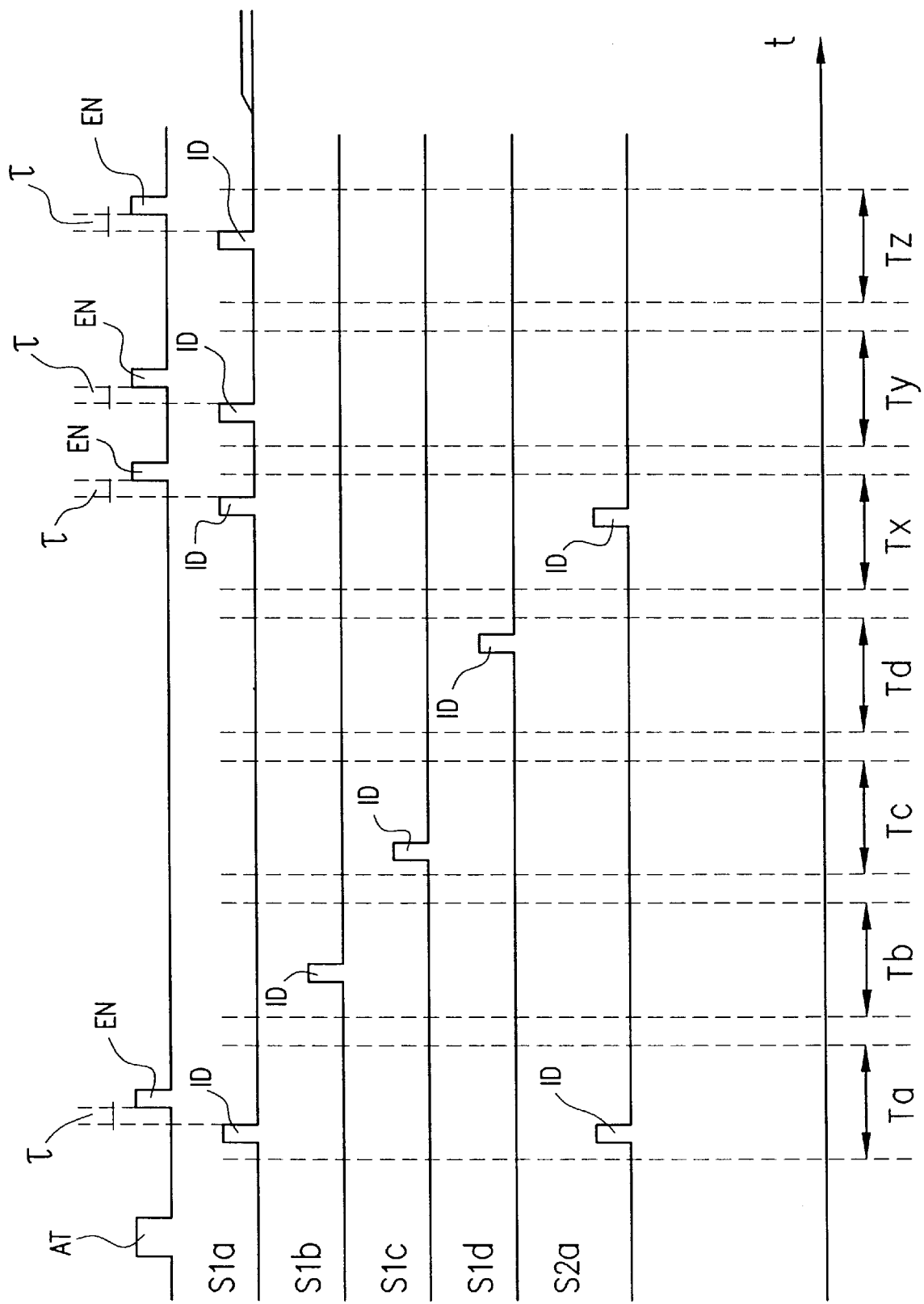
FIG. 5 is a diagram showing the signals exchanged between the probes and an interface device in a system according to the invention.

FIG. 5 schematically shows the signals transmitted by one of the interface devices (I1) and by some probes.

The system operation is now described, firstly from a logic point of view, and thereafter with reference to the block diagrams in FIGS. 2 and 3.

In the working environment, schematically shown in FIG. 1, all the probes on all the machine tools are in a standby, low-power state and only some of the circuits of each probe are powered.

The procedure for activating—on machine M1—a selected probe, for example probe S1a, for performing a checking cycle on that machine M1 and maintaining the other probes on the same or on other machines in a stand-by state is the following:

The numeric control N1 sends an appropriate signal for the starting of the procedure to interface device I1 (block 51), that generates and transmits a generic activation signal AT (block 52).

Signal AT causes the energizing, in other terms the high-power state of a part of the probes (for example probes S1a, S1b, S1c, S1d, S2a), i.e. the probes within the operating range of interface device I1 (block 53). Each activated probe generates and sends, within a predetermined time interval (Ta, Tb, Tc, Td) an identification signal ID (block 54).

The instant at which the transmission of each of the identification signals ID starts is of random type and is evenly distributed within the associated time interval.

The interface device I1 detects the reception of the identification signal ID of the selected probe (S1a) on the basis of the characteristics of the signal ID (block 55). If the interface device I1 does not detect the reception of the aforementioned signal ID within a predetermined time limit, the procedure starts again from the beginning (block 56).

At the reception of the proper ID signal and subsequently to a prefixed time delay τ (block 57), the interface device I1 sends a generic enable signal EN (block 58).

The probes that have not received the enable signal EN within a time delay τ from the instant at which they transmitted their associated identification signals ID, de-energize and return to the stand-by state (blocks 59, 60).

Conversely, the probes that receive the enable signal EN within the formerly mentioned time delay τ (from the instant at which they transmitted their associated identification signals ID), re-send their identification signals ID at random moments within a subsequent, predetermined time interval Tx, and the previously described steps (blocks 54–60) are repeated.

These steps are repeated for other times: in the illustrated example twice, by sending identification signals ID in time periods Ty and Tz. At the end of the activation procedure (block 61) the selected probe S1a, that after every transmission of the identification signal ID has always received an enable signal EN, subsequently to the time delay τ, is thus activated and sends signals relating to the condition of the probe and the battery (identified by number 24, in FIG. 3), so starting the actual checking cycle. Probe S1a is automatically deactivated (blocks 63, 64) after a time period counted starting from the activating of probe S1a, or from an operating phase of probe S1a (for example from the last monitoring of a state variation).

As the instant of transmission of the identification signal ID (within a predetermined time period) is of random type and the ID signals have different characteristics, it is extremely unlikely that several probes be accidentally activated. Even if a similar condition is quite improbable, there is a chance it may occur at the beginning of the activation procedure to probes on different machines, for example, subsequently to the first sending of the enable signal EN, as shown in FIG. 5. However, additional exchanges of identification signals ID (only from the active probes) and enable signals EN permit to improve the selecting of just the probe (S1a) that it is actually required to activate. Obviously, the probability that undesired activations occur is reduced further the greater is the number of enable signals EN required for ending the procedure (block 61).

In the example shown in FIG. 5, the transmissions of identification signals ID from probes S1a and S2a, subsequently to the reception of the initial AT signal, are substantially simultaneous. The enable signal EN is received by both probes S1a and S2a after the elapsing of time τ and thus both remain activated, and transmit associated identification signals ID at random moments within the following interval Tx.

However, in this case the ID signals sent by S1a and S2a occur at distinct moments: the interface device I1 ignores the ID signal of probe S2a (owing to the fact that its frequency indicates that it comes from a different machine, M2), and as the latter does not receive the enable signal EN at the appropriate time period (after delay τ), it is de-activated and returns to the stand-by state.

It is practically impossible to activate a probe by the previously described activation procedure, without considering the identification signals ID transmitted by the probe. Thus, it is extremely improbable that noise can activate a probe.

With reference to the block diagrams shown in FIGS. 2 and 3, the system operates in the following way.

When the system is in a stand-by state, within the circuits of each probe (FIG. 3) the transmitter section 35 and the logic section 37 are de-activated (switches 20 and 31 open). As the receiver section 36 has not received any signals, it is powered, through switch 40, with pulses generated by oscillator 42 and sent to gate 41. The presence of the oscillator 42 (that has negligible consumption) enables to minimize the energy consumption by the probe in the stand-by state. According to a typical embodiment, the pulses emitted by oscillator 42 last 5 msec and occur at 50 msec intervals from each other, hence permitting to reduce the average energy consumption of the receiver section 36 (and thus in the stand-by state that of the entire probe) by about 90%.

When the numerical control N1 sends a start signal to logic unit 1 of the interface device I1 (FIG. 2), unit 1 generates a generic activation signal AT. The radio-frequency carrier generated by oscillator 3 (which is the same for the different interface devices I1, I2, I3) is modulated, in modulator 2, by the activation signal AT, and then amplified (4). The resulting signal is irradiated by aerial 5 and captured by the aerial 14 of each probe that is within the range of the aerial 5. The received signal is amplified (15), demodulated (16), filtered (17) and amplified again

(18) for each probe. The signal (typically lasting 100 msec) is sent to detector 19, that, as a consequence, keeps the switch 40 closed (by means of gate 41) and, by means of gate 23, causes the closure of switch 20 that connects the battery 24 to the logic section 37.

The decoder 21 identifies the activation signal AT and sends a suitable signal to the logic control unit 22, that sends signals to switch 40 (through gate 41) and to switch 20 (through gate 23) for keeping the receiver section 36 and the logic section 37 powered. Furthermore, logic unit 22 sends an enable signal to switch 34 for connecting the coder 26 of identification signals ID to modulator 25 of the transmitter section 35. Moreover, logic unit 22 power supplies the transmitter unit 35 (by means of switch 31) just for the time necessary for the transmission of identification signals ID, in order to avoid interferring with the reception of subsequent enable signals EN.

Furthermore, the logic unit 22 defines, on the basis of the signals arriving from devices 29, the transmission time intervals (Ta, Tb, . . . ) and, within these time intervals, the random instants at which the identification signals ID are transmitted. Unit 22 has the additional task of checking that the enable signals EN are being received subsequently to the requested delay time τ from the transmitting of identification signals ID. If an enable signal EN is not received subsequently to time delay τ, unit 22 stops the energizing of the various sections and brings the probe circuits back to a stand-by condition.

The identification signals ID are sent to modulate (25) the carrier generated by the radio-frequency oscillator 27. The frequency of the latter oscillator—that may be a specific characteristic of the machine on which the probe is installed—is defined by signals arriving from the programming devices 29. The modulated signal is then amplified (28), irradiated by aerial 14, received by aerial 5 and processed by the superheterodyne receiver of the interface device I1 (blocks 6, 7, 8, 9, 10). The frequency of the local oscillator 8 is defined by signals arriving from the programming device 30. If these latter signals represent the same radio-frequency channel set on the transmitter section 35 of the probe and defined by devices 29, at the output of the demodulator 10 there is present identification signal ID, that is sent to decoder 11. On the basis of the indications provided to the decoder 11 by the numeric control N1 and relating to the probe S1a that it is desired to activate, a check is made to ascertain whether the received signal ID has been transmitted by the selected probe S1a. In the affirmative, block 11 sends a signal that—after delay τ (12)—causes the generating by block 1 of a generic enable signal EN that modulates the carrier generated by the radio-frequency oscillator 3. The signal supplied after the subsequent amplification (4) is irradiated by aerial 5.

When the interface device I1 is receiving, block 1 keeps the radio-frequency oscillator 3 off in order to avoid interferences.

The signal irradiated by aerial 5 is received by the aerial 14 of each probe that is within the range of aerial 5. The received signal is recognized by decoder 21 as the enable signal EN, and the logic unit 22 checks to see that the signal has been received within the time delay τ from the transmission of the identification signal ID, and in this case it is interpreted as a reply by the interface device I1 to the identification signal ID transmitted by the probe. A new identification signal ID is generated (26) and sent by means of the transmitter section 35.

Once the procedure for activating the selected probe (for example, probe S1a) has been successfully accomplished, after receiving a sufficient number of enable signals EN, logic control unit 22 maintains the transmitter section 35 powered and, by means of switch 34, connects coder 33, relevant to signals arriving from the probe among which the signals monitoring the state of the probe and the battery, to modulator 25 of the transmitter section 35, thus commencing the normal transmission.

On the basis of the signals received by interface I1, through aerial 5, the signals monitoring the state of the probe and that of the battery are sent, by means of decoder 13, to numeric control N1.

The de-activating of the circuits in the probe (S1a), in other terms the returning to the stand-by state, occurs when the time set in a timer inside unit 22 elapses. According to a typical embodiment of the hereindescribed system:

the activation signal AT is made up by the emitting of a radio-frequency carrier modulated at 10 KHZ for approximately 100 msec;

the intervals Ta, Tb, Tc, Td, Tx, Ty, Tz last approximately 128 msec and occur at 20 msec intervals from one another;

the identification signals ID are supplied by modulating a radio-frequency carrier with serial sequences of bits at 10 Kbit/sec frequency and with complete signal duration time of about 5 msec;

the characteristics of the enable signals EN are similar to those of the activation signal AT, apart from the duration that is of about 11 msec;

time τ is of approximately 20 msec.

According to a possible embodiment, differing slightly from the procedure described with reference to FIG. 5, the probes, that—when activated by the initial signal AT—receive an enable signal EN before transmitting their identification signals ID, are de-activated (in other terms return to the stand-by state) by the enable signal EN (in the example shown in FIG. 5, the probes S1b, S1c and S1d, activated by AT, would be in that case de-activated by EN). The reasons and the practical advantages offered by this different embodiment appear evident by the previously described logic of operation. The extremely schematic and linear procedure, shown in FIG. 5, has been illustrated for the purpose of providing simplicity and clarity to the description.

The previously described method relating to a radio-frequency transmitting system can be employed even in the case of other wireless signals, for example of optical type.

The invention can be applied, for example, in the following cases:

a plurality of coordinate measuring machines in a single working environment, or machine tools and/or measuring machines equipped with checking probes;

just a single machine tool or measuring machine, with a plurality of checking probes;

coordinate measuring machines with or without numeric control;

the above cases, in which the checking probes are contact detecting probes, and/or measuring probes comprising detecting devices with transducer means.

What is claimed is:

1. A system comprising
a plurality of assemblies with
checking probes,
detecting devices,
transmitting devices for generating and wireless sending identification signals,
receiving devices for the wireless reception of an activation signal for activating the assemblies, a power supply, and a switch for providing a connection between the power supply and the transmitting devices, and a control unit, physically remote from the assemblies, for generating and transmitting said activation signal, for receiving the identification signals, and for generating and transmitting to the assemblies a confirmation signal, wherein said receiving devices can receive said confirmation signal, and wherein one of said transmitting devices of each checking probe defines a corresponding time interval, and said identification signal of a preselected probe is transmitted within the corresponding defined time interval to the control unit; and wherein, upon reception of said identification signal, said control unit generates and transmits said confirmation signal.

2. A system according to claim 1, wherein the receiving devices of the probes comprise timers for controlling said switch to inhibit the connection between the power supply and the transmitting devices.

3. A system according to claim 2, wherein the probes are contact detecting probes, and the control unit includes a constant delay generator for transmitting said confirmation signal after a predetermined delay ($\tau$) from the receiving of a predetermined identification signal.

4. A system according to one of the preceding claims, wherein the transmitting devices are radio-frequency transmitting devices and the receiving devices are radio-frequency receiving devices.

5. A system comprising at least a contact detecting probe with detecting devices for detecting the contact between the probe and a workpiece to be checked, a power supply battery, transmitting devices for the wireless transmission of signals, a switch for connecting and disconnecting the battery to said transmitting devices, and receiving devices, connected to the switch, for receiving a wireless activation signal and controlling the connection between the battery and said transmitting devices, and at least a control unit, physically remote from the probe, and adapted for transmitting said activation signal, characterized in that the switch contains a controller for automatically connecting and disconnecting the battery to the receiving devices, wherein the transmitting devices are radio-frequency transmitting devices and the receiving devices are radio-frequency receiving devices.

6. A system according to claim 5, wherein said controller of the switch comprises an oscillator circuit.

7. A method for controlling the activation of a remote assembly by a control unit in a system with at least one control unit and a plurality of assemblies, physically remote from the control unit and each assembly comprising a probe, a power supply, detecting devices, receiving devices and transmitting devices for receiving and transmitting wireless signals, the method comprising the following steps:

generating and sending an activation signal by the control unit, receiving said activation signal by the receiving devices of at least a part of said plurality of assemblies, temporary energizing the assemblies of said selected part upon receipt of said activation signal, sending, by the transmitting devices of the assemblies belonging to said part, associated identification signals at instants subsequent to said temporary energizing, receiving the identification signals by the control unit, sending, by the control unit, a confirmation signal upon reception of one of the identification signals, and interrupting the temporary energizing of each assembly that does not receive the confirmation signal subsequently to the sending of the associated identification signal, characterized in that the step of sending identification signals occurs, for each assembly of said part, within a predetermined time interval, and the confirmation signal is sent upon reception of the identification signal of a preselected assembly within the corresponding predetermined time interval.

8. The method according to claim 7, wherein the step of sending identification signals takes place, for each assembly of said part, at a random moment within said predetermined time interval.

9. The method according to claim 8, wherein the step of sending, by the control unit, the confirmation signal occurs after a predetermined time delay ($\tau$) from the reception of the identification signal of the selected assembly.

10. A method according to one of claims from 7 to 9, for controlling the activation of a selected probe in a system with a numeric control machine comprising said plurality of assemblies, wherein the predetermined time intervals are distinct from one another.

11. A method according to one of the claims from 7 to 10, for controlling the activation of a selected probe in a system with a plurality of numeric control machines carrying said plurality of assemblies, wherein an identification signal transmitted by one of the assemblies of said part has a characteristic relating to the machine that carries the assembly.

12. A method according to claim 11, wherein the step of receiving the identification signals by the control unit comprises the identification, by the control unit, of said characteristic.

13. A method according to claim 12, wherein said characteristic is a transmission frequency.

14. A method according to one of claims 7 to 9, wherein said wireless signals are radio-frequency modulated signals.

15. A method according to one of claims from 7 to 10, wherein said wireless signals are optical signals.

* * * * *

UNITED STATES PATENT AND TRADEMARK OFFICE
CERTIFICATE OF CORRECTION

PATENT NO. : 6,115,647

DATED : Sep. 5, 2000

INVENTOR(S) : Carli et al.

It is certified that errors appear in the above-identified patent and that said Letters Patent is hereby corrected as shown below:

Column 5, line 47, delete "the-reception", substitute --the reception--.

Claim 7, line 12, delete "selected".

Signed and Sealed this

Seventeenth Day of April, 2001

*Attest:*

NICHOLAS P. GODICI

*Attesting Officer*     *Acting Director of the United States Patent and Trademark Office*